No. 718,661. PATENTED JAN. 20, 1903.
R. SCHULZ.
STEAM TURBINE.
APPLICATION FILED APR. 22, 1901.
NO MODEL. 5 SHEETS—SHEET 1.

Inventor:
Richard Schulz.

Witnesses:

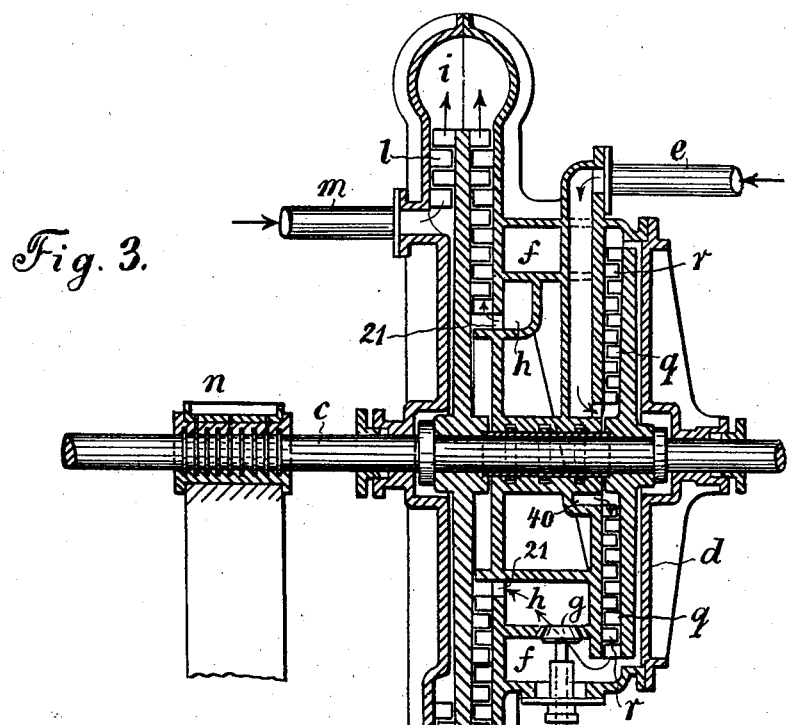
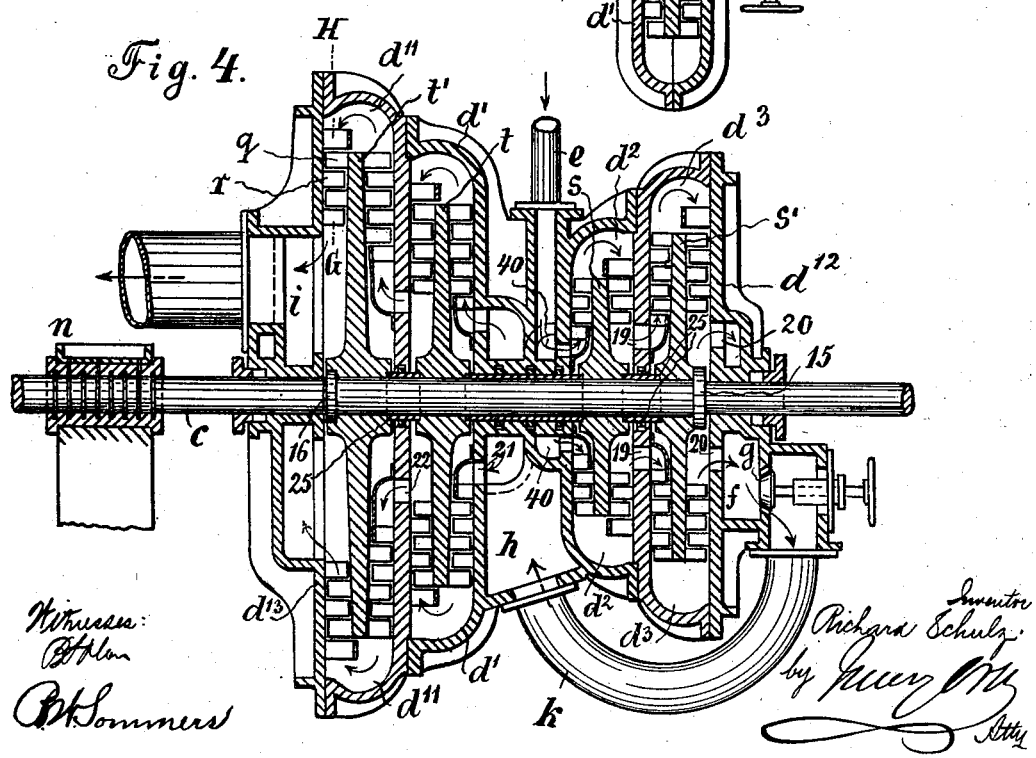

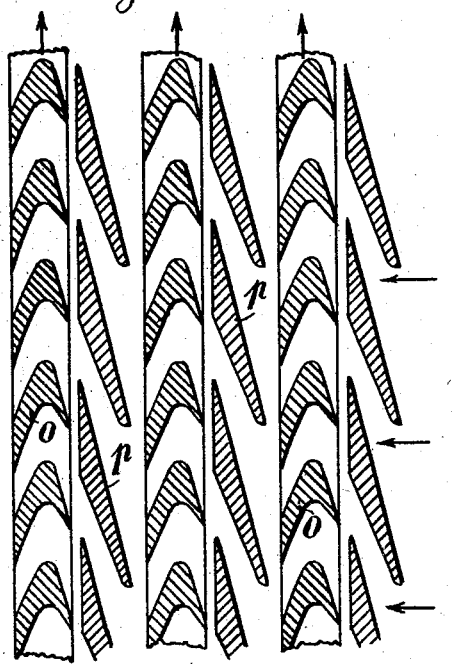
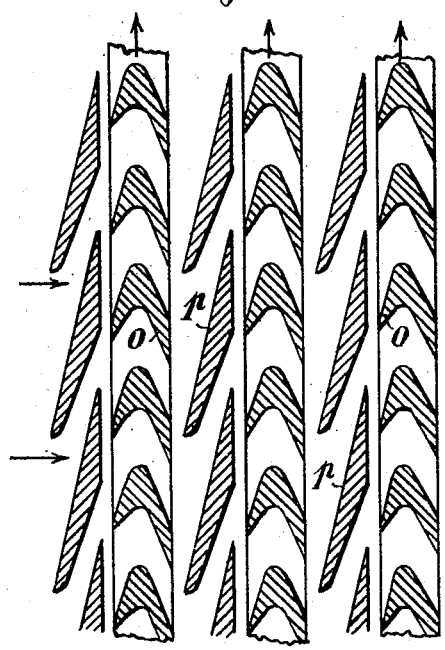
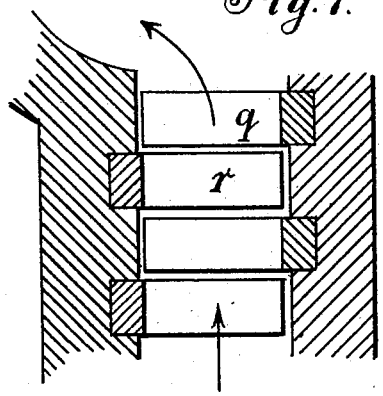
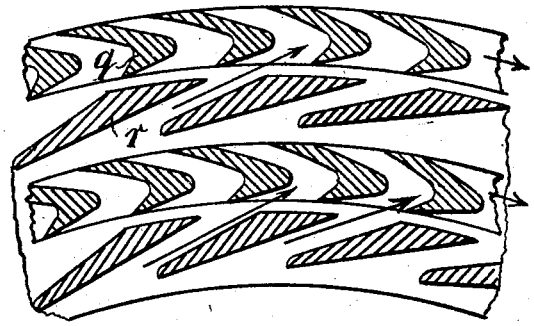

No. 718,661.  
PATENTED JAN. 20, 1903.  
R. SCHULZ.  
STEAM TURBINE.  
APPLICATION FILED APR. 22, 1901.  
NO MODEL.  
5 SHEETS—SHEET 4.
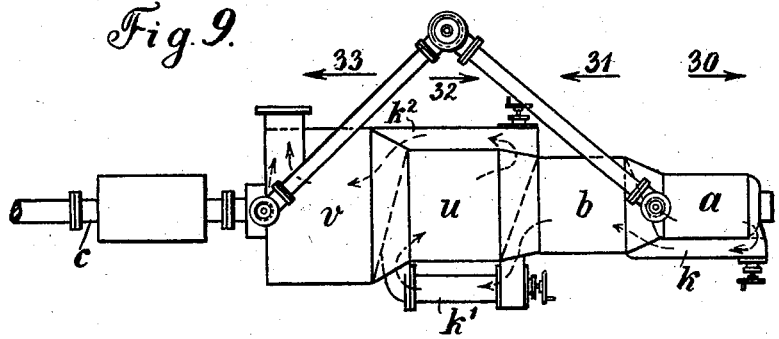
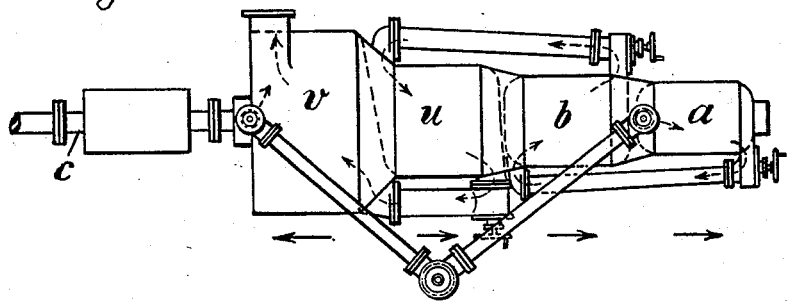
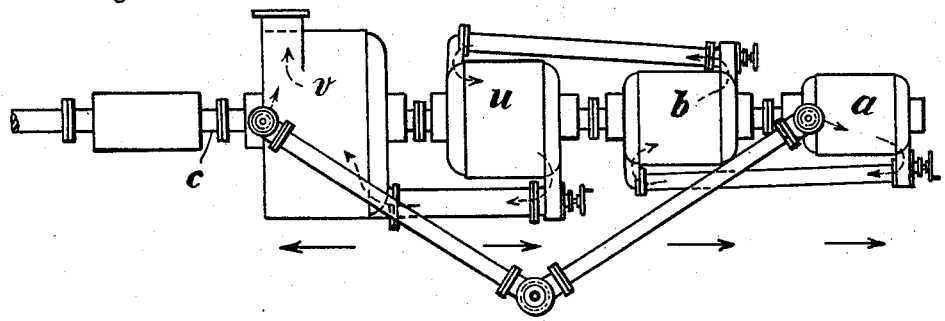

No. 718,661. PATENTED JAN. 20, 1903.
R. SCHULZ.
STEAM TURBINE.
APPLICATION FILED APR. 22, 1901.
NO MODEL. 5 SHEETS—SHEET 5.

Witnesses
Inventor.
Richard Schulz.

UNITED STATES PATENT OFFICE.

RICHARD SCHULZ, OF BERLIN, GERMANY.

STEAM-TURBINE.

SPECIFICATION forming part of Letters Patent No. 718,661, dated January 20, 1903.

Application filed April 22, 1901. Serial No. 56,986. (No model.)

*To all whom it may concern:*

Be it known that I, RICHARD SCHULZ, a subject of the Emperor of Germany, residing at Berlin, in the Empire of Germany, have invented certain new and useful Improvements in Steam-Turbines; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to steam-turbines, more particularly to turbines known as "compound" turbines, and relates to both classes of compound turbines—tandem and cross-compound—and has for its object the relative arrangement of parts, so as to take up or balance the axial thrust of the shaft, and details of construction to be hereinafter particularly pointed out and claimed.

Figure 1:
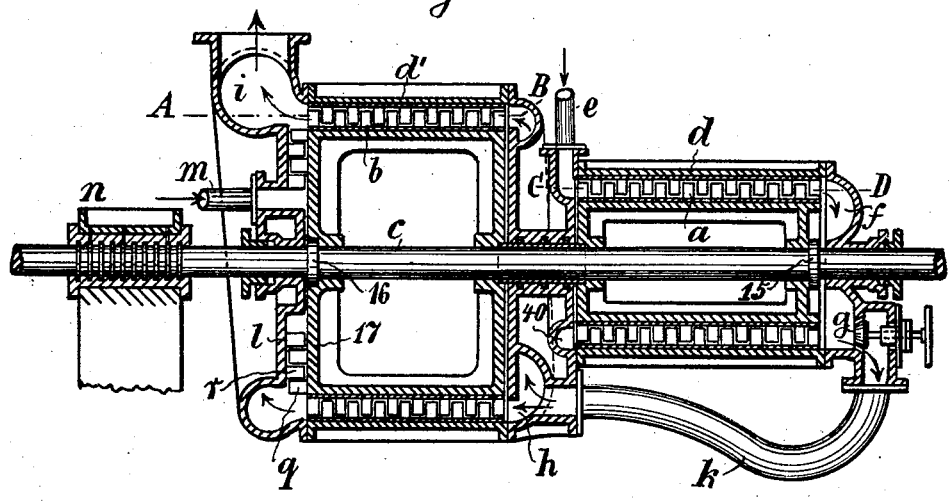
Figure 2:
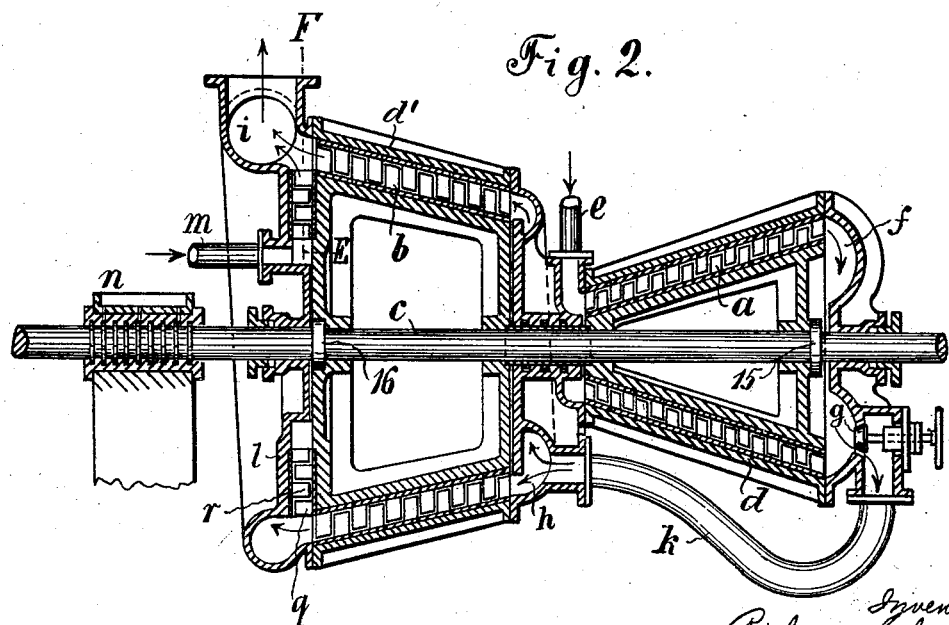
Figure 12:
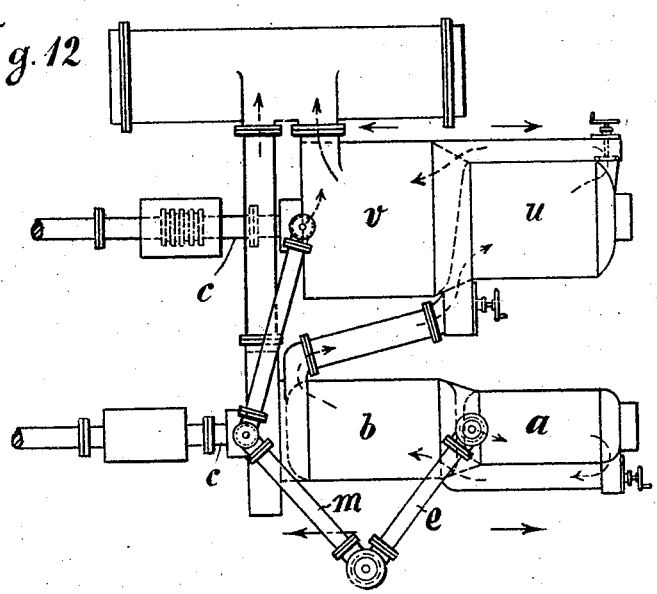
Figure 13:
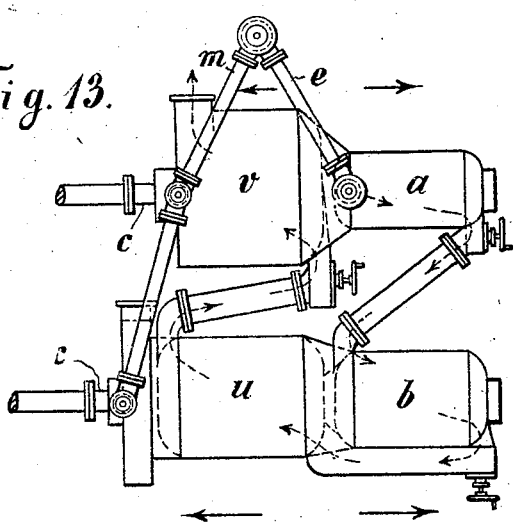

Referring to the drawings, in which like parts are similarly designated, Figure 1 is a section of a tandem compound axial steam-turbine. Fig. 2 is a section of a similar one, being a modification between an axial and a radial turbine. Fig. 3 is a section of a radial turbine, and Fig. 4 is a section of a similar one provided with a plurality of turbine-wheels in the high and low pressure turbines. Fig. 5 is a section on line A B, and Fig. 6 is a section on line C D, of Fig. 1. Fig. 7 is a section showing the arrangement of gates and blades in elevation, and Fig. 8 is a section on line F F of Fig. 2 and G H of Fig. 4 through the gates and turbine-blades. Fig. 9 shows a compound tandem turbine of four elements; Fig. 10, a view of a similar device. Fig. 11 shows four independent turbines arranged tandemwise on a single shaft. Figs. 12 and 13 show types of cross-compound turbines.

Referring to Figs. 1 to 4, I have shown a shaft $c$, upon which are secured high and low pressure turbines $a$ and $b$, connected in tandem, the high-pressure turbine $a$ arranged to have an axial pressure in one direction and the low-pressure turbine $b$ in the opposite direction, so that their combined action will wholly or partially compensate for the axial strain on the propeller or other shaft $c$.

In Fig. 1, which shows an axial turbine—one in which the steam has a general course through it parallel to the axis—the high-pressure turbine $a$ is secured to the shaft $c$, which is provided with an abutting collar 15, and the low-pressure turbine $b$ similarly secured and abutting against the collar 16. The gates in the high-pressure turbine, which are arranged on the casing $d$, and the buckets, which are arranged on the moving part or body of the wheel, are given such form as to cause this turbine to revolve in one direction when the steam passes through it from end to end, while the buckets on the turbine $b$ and the gates on the casing $d'$ of the low-pressure turbine are arranged to cause this turbine to revolve in the same direction, steam entering and passing through the two turbines in opposite directions.

In Fig. 1 steam enters at $e$, passes between the gates on casing $d$, revolving the turbine $a$, then passes to the overflow-chamber $f$ at the opposite end, from which it passes through a controlling-valve $g$ into the pipe $k$, whence it enters the inlet-passage $h$ of the low-pressure turbine proximate to the inlet-passage 40 of the high-pressure turbine, from this passage $h$ between the gates on the casing $d'$, revolving the turbine $b$ in the same direction as turbine $a$, into the exhaust-passage $i$, thence to the exhaust-pipe.

In order to enable the turbine to be reversed, there is arranged on the disk 17, forming one end of the low-pressure turbine, a series of buckets $q$, coöperating with a series of gates $l$ of the low-pressure-turbine head. This turbine is a radial turbine in which steam enters at $m$, near its center, passes radially through one or more alternate sets of gates and buckets into the exhaust-passage $i$, the other two turbines—the high and low pressure turbines $d$ and $d'$—running idle.

The hand-valve $g$, controlling the passage of steam from the high to the low pressure turbine, enables the pressure of the steam in the two turbines to be varied, so as to balance or nearly balance the axial thrust of the shaft $c$.

Fig. 2 is a modification in which the steam enters the high-pressure turbine near its center, the turbine-body having conical form, so that the passage of steam between the gates and buckets will be both radial and axial in a general direction from end to end. A similar arrangement is shown for the low-pressure turbine, whose body is of conical shape and carrying at its larger end a turbine for running in opposite direction, which is normally idle when running positive.

Fig. 3 shows a tandem compound radial turbine in which steam is admitted at the pipe $e$, carried to the annular inlet-chamber 40 at the center of the high-pressure-turbine body, which is substantially disk-shaped, and expanded radially toward its periphery between the fixed gates $r$ on the casing and the buckets $q$, located on the disk $a$, which is secured to the shaft $c$. Thence it is carried through the overflow-passage $f$ into the inlet-chamber $h$ of the low-pressure turbine, situated so as to deliver steam through ports 21, also near the center of this disk, and expanded radially outward between the gates and buckets into the exhaust-passage $i$. On the opposite face of the disk $h$, forming the low-pressure turbine, is a reversing-turbine similar to those shown in Figs. 1 and 2. It will be seen that steam is admitted to the high-pressure turbine nearest the center and that this turbine is smaller in diameter than the succeeding ones. Steam enters the low-pressure turbine at ports 21, somewhat farther from the center than those, 40, of the high-pressure turbine. Steam enters by the auxiliary passage $m$ near the periphery of the low-pressure-turbine disk $b$ to drive the reversing-turbine.

Fig. 4 shows a tandem compound turbine in which the high-pressure and the low-pressure turbines each consists of a plurality of radial turbines or turbine-disks and sectional casings, each successive casing in each of the turbines being larger than the other preceding one, and the turbine-disks secured to a common shaft are each larger than the preceding disk. It will be seen that the casing $d^2$ for the first turbine-disk of the high-pressure turbine is the smaller. Steam enters from the passage $e$ and inlet-ports 40 near its center, passes radially between the gates and movable buckets on the disk to the periphery of said disk, returning on the other side of it from the periphery to the center through the ports 19 at the center of the second section of the casing $d^3$, larger in diameter than the one $d^2$, and passes radially outward to move the second turbine-disk $s'$, returning on the other side of said disk from the periphery toward the center, through the ports 20 to the overflow-chamber $f$, thence through the controlling-valve $g$ into the pipe $k$ to the inlet-chamber $h$ of the low-pressure turbine. This chamber delivers steam through ports 21 in the casing $d'$ near the center to the turbine-disk $t$, passing radially between the gates and buckets to the periphery, returning toward the center on the other side of these disks between other gates and buckets to ports 22 in the second section of the turbine-casing $d^{11}$, thence radially between the gates and buckets of the second low-pressure turbine-disk $t'$ to the periphery of turbine-disk $t'$, returning on the other side of this disk from the periphery toward the center to the exhaust-passage $i$. It will be seen that the sections of the turbine-casing $d^2$ $d^3$ are formed so as to interfit and that a plurality of such casings, each larger than the next preceding, can be arranged one after the other, each containing a turbine-disk $s$ $s'$, and the last one covered by an end plate $d^{12}$. The low-pressure turbine is similarly made, its sections $d'$ $d^{11}$ being arranged to interfit, and the last section covered by an end plate $d^{13}$, each section of the casing carrying a turbine-disk keyed to the shaft $c$. Between the turbine-disks is located a collar or sleeve 25, which transmits the axial thrust of all the turbine-disks in the set toward the end disk, which bears against a collar 15 or 16 at the end of each series.

In Fig. 9 I have shown four turbines arranged in tandem, the high-pressure turbine $a$ producing an axial thrust on the shaft in the direction of the arrow 30, the next turbine, $b$, in the direction of arrow 31, the next, $u$, in the direction of arrow 32, and the low-pressure turbine $v$ in the direction of arrow 33, steam entering from the pipe $e$ passing through the low-pressure turbine $a$ back to the intermediate turbine $b$ through the pipe $k$, then through the pipe $k'$ to the second intermediate turbine $u$, thence by pipe $k^2$ to the low-pressure turbine. These turbines exert an axial pressure alternately in opposite directions.

Fig. 10 shows an arrangement of four turbines, three of which at the high-pressure end exert an axial pull in one direction, while the other, the low-pressure turbine, an axial pull in an opposite direction. Fig. 11 is a similar arrangement of four independent turbines similarly connected.

Fig. 12 shows two pairs of tandem turbines connected as cross compound. Steam passes through one pair in tandem, then over to the parallel pair, and through them in tandem, and Fig. 13 shows two pairs of turbines, steam passing through the high-pressure turbine $a$, crossing over to the intermediate turbines $b$ $u$, passing through them in tandem, and then across to the low-pressure turbine $v$ on same shaft as the high-pressure turbine $a$.

The arrangement of gates and buckets is shown in section, arranged with one side parallel with the direction of revolution of the coöperating moving elements, while the rear face of one gate and the forward face of the next behind coöperate to form a passage either of the same diameter or of decreasing diameter from inlet to delivery end. The buckets $c$ have a sharp edge passing the delivery-orifices between the gates that lead into a pocket or reëntrant angle in the buckets. The passage between the buckets from the sharp edges on the entrance side to the rear is decreasing in area.

Having thus described my invention, what I declare as new therein, and desire to secure by Letters Patent, is—

1. In combination high and low pressure turbines connected in tandem, organized to exert axial pressure in opposite directions and a radial reversing-turbine in the low-pressure casing, substantially as described.

2. In combination, a casing, a shaft, a plurality of turbines on the shaft and in said casing and arranged in sets, a collar fixed on the shaft against which the last turbine of each set abuts, sleeves on the shaft between adjacent turbines of a set, means to compound the turbines and cause steam to pass through the sets in opposite directions, whereby the axial thrust of the separate turbines of a set will be transmitted by the sleeves to said collars, substantially as described.

3. In combination, a casing, a shaft, a plurality of radial turbines on the shaft arranged in two sets, a collar on the shaft at the end of each set, sleeves surrounding the shaft and between adjacent turbines of a set, means to tandemly compound all the turbines, a steam-supply pipe between the sets of turbines and a reversing-turbine formed on one of the low-pressure turbines, said sets of turbines arranged to exert axial pressure in opposite directions, substantially as described.

In testimony that I claim the foregoing as my invention I have signed my name in presence of two subscribing witnesses.

RICHARD SCHULZ.

Witnesses:
JOHANNES HEIN,
HENRY HASPER.